United States Patent [19]

Filas et al.

[11] Patent Number: 4,776,674

[45] Date of Patent: Oct. 11, 1988

[54] LIQUID CRYSTAL DEVICE WITH CHEMICALLY-INDUCED HIGH-TILT ALIGNMENT COATING

[75] Inventors: Robert W. Filas, Bridgewater Township, Somerset County; Jayantilal S. Patel, Scotch Plains, both of N.J.

[73] Assignee: American Telephone and Telegraph Company, AT&T Bell Laboratories, Murray Hill, N.J.

[21] Appl. No.: 878,117

[22] Filed: Jun. 25, 1986

[51] Int. Cl.$^4$ ............................................ G02F 1/135
[52] U.S. Cl. ............................. 350/339 R; 350/340; 350/341
[58] Field of Search .................. 350/341, 340, 339 R; 428/1

[56] References Cited

U.S. PATENT DOCUMENTS

| | | | |
|---|---|---|---|
| 3,834,792 | 9/1974 | Janning | 350/341 |
| 3,912,369 | 10/1975 | Kashnow | 350/341 |
| 4,634,229 | 1/1987 | Amstutz et al. | 350/350 R |

OTHER PUBLICATIONS

Demus, "Chemical Composition and Display Performance", *Nonemissive Electrooptic Displays*, ed. KMETZ et al., Plenum Press, New York, 1976.
"Alignment of Nematic Liquid Crystals and Their Mixtures", *Molecular Crystal Liquid Crystal*, Suppl. 1, 1982, pp. 1-79, J. Cognard.
"24×80 Character LCD Panel Using the Supertwisted Birefrigence Effect", Society for Information Display 85 Digest, 1985, pp. 120-123, T. J. Scheffer, et al.
"A Liquid-Crystal Optical-Switching Device ($\pi$ Cell)", Society for Information Display 83 Digest, 1983, pp. 30-31, P. J. Bos, et al.
"New Bistable Cholesteric Liquid-Crystal Display", *Applied Physics Letters*, vol. 37, No. 1, Jul. 1980, pp. 109-111, D. W. Berreman, et al.
"Hybrid Alignment in Phase-Change Guest-Host LCDs", Society for Information Display 84 Digest, 1984, pp. 206-208, R. W. Filas.
"On Different Boundary Conditions of Nematic Films Deposited on Obliquely Evaporated Plates", *Letters in Applied and Engineering Sciences*, vol. 1, 1973, pp. 19-24, E. Guyon, et al.
"Alignment of Nematic Liquid Crystals by Inhomogeneous Surfaces", *Journal of Applied Physics*, vol. 57, No. 2, Jan. 1985, pp. 186-192, H. L. Ong, et al.
"Tilted Alignment of MBBA Induced by Short-Chain Surfactants", *Journal of Physics*, vol. 37, Oct. 1976, pp. 1245-1252, G. Porte.
"A LC/CRT Field-Sequential Color Display", *Society for Information Display 83 Digest*, 1983, pp. 28-29, R. Vatne, et al.

*Primary Examiner*—Stanley D. Miller
*Assistant Examiner*—David Lewis
*Attorney, Agent, or Firm*—Michael J. Urbano

[57] ABSTRACT

High-tilt (e.g., 5°-85°) can be achieved by chemical treatment of the interior surfaces of a liquid crystal device. Illustratively, the treatment entails applying a combination of surface coupling agents one of which alone would cause the LC director to make and angle $\alpha_1$ (e.g., $\alpha_1 = 0°$; homogeneous alignment) with the surface and another of which alone would yield $\alpha_2$ (e.g., $\alpha_2 = 90°$, homeotropic alignment), but together they produce $\alpha_3$ different from $\alpha_1$ and $\alpha_2$.

29 Claims, 1 Drawing Sheet

TILT-ANGLE VERSUS COMPOSITION

LIQUID CRYSTAL DEVICE WITH CHEMICALLY-INDUCED HIGH-TILT ALIGNMENT COATING

BACKGROUND OF THE INVENTION

This invention relates to the alignment of liquid crystal (LC) molecules in liquid crystal devices. Although the description which follows deals with liquid crystal displays (LCDs), the primary intended application, the invention is also useful in other devices such as optical shutters.

In a conventional LC cell the interior major surfaces of the glass plates, with electrodes deposited thereon, are each coated with a thin polymer. The polymer layers are rubbed (e.g., with a cloth) to orient the polymer chains or to form microscopic grooves along a predetermined direction. The LC molecules contacting the polymer align themselves along that direction by interacting with the polymer chains or the microscopic grooves. Thus, the polymer layers are known in the LC art as alignment coatings. In the absence of such layers, the LC molecules at the cell surface would tend to orient themselves randomly in contrast with having a preferred orientation established by the boundary conditions of the alignment coating.

Nematic LC materials, for example, can be easily aligned by coating both of the interior surfaces of the cell with a polyimide (usually a polymide) and by unidirectional rubbing of both of the polymer layers. If an appropriate crystalline polymer is used, such a surface treatment can also align smectic LC materials.

The orientation of LC molecules at surfaces is usually described in terms of the tilt bias angle ($\alpha$) defined as the angle made between the liquid crystal director and the plane of the surface (see FIG. 2, inset). When $\alpha$ is zero or nearly zero degrees (i.e., $\alpha=0°\pm5°$), the orientation is referred to as "homogeneous", and, when it is ninety or nearly ninety degrees (i.e., $\alpha=90°\pm520$), it is referred to as "homeotropic". It is generally a simple matter to produce LC orientations which are either homogeneous or homeotropic, but it has been much more difficult to achieve orientations with $\alpha$ between these extremes. For example, unidirectional homogeneous alignment is typically produced by rubbing a polymer-coated surface, and homeotropic alignment can be produced by treatment of a surface with a surfactant such as a silane or a chromium complex (J. Cognard, *Molecular Crystal Liquid Crystal*, Suppl. 1, p. 1 (1982)). There are several types of liquid crystal devices, however, which require high-tilt angles in the range of about 20–50 degrees: the super-twisted birefringent (SBE) LCD (T.J. Scheffer, et al., *Society for Information display 85 Digest*, p. 120 (1985)), the optical shutter pi-cell, (P.J. Bos, et al., *Society for Information Display 83 Digest*, p. 30, (1983)), the cholesteric bistable LCD (D.W. Berreman, et al., *Applied Physics Letters*, Vol. 37, p. 1072, (1980)), and the tilted-hybrid phase-change guest-host LCD (R.W. Filas, *Society for Information Display 84 Digest*, p. 206, (1984)). The conventional method for producing such high-tilt surfaces has been to employ high-vacuum evaporation of materials such as silicon monoxide at oblique evaporation angles. (E. Guyon, et al., *Letters in Applied and Engineering Sciences*, Vol. 1, p. 19, (1973)). SiO can also be used to produce homogeneous alignment. When the evaporation angle is $30°\pm10°$ to the plane of the surface, homogeneous alignment of LCs occurs in a direction orthogonal to the evaporation direction. Using this technique, H.L. Ong, et al., *Journal of Applied Physics*, Vol. 57, No. 2, p. 186, (1985), describe titled alignment of nematic LCs by using microscopically inhomogeneous surfaces. The surfaces consisted of small patches or islands of one material (i.e., the silane DMOAP) favoring homeotropic alignment surrounded by a matrix of another material (i.e., SiO) favoring homogeneous (planar) alignment. However, this procedure is time-consuming and can limit the substrate size which in turn limits the size of the display.

In view of the difficulties in achieving high-tilt angles, a chemical process would be highly desirable. The only previously known example of high-tilt produced chemically is given in a paper by G. Porte, *Journal of Physics* (Paris), Vol. 37, p. 1245 (1976). He observed that by treating a clean glass surface with a monolayer of aliphatic monoamines of varying alkyl chain length, n, the orientation of the nematic N-(p-methoxybenzilidene)-p'-butylaniline (MBBA) to be either tilted ($6<n<10$) or homeotropic ($12<n<16$). In his experiments, the liquid crystal was allowed to flow by capillarity into a cell, and the tilt direction was determined by the flow direction of the liquid. This method naturally produces antiparallel tilt (FIG. 5, p. 1247) on the two surfaces, which is not generally desirable. Although he claims that it is possible to produce uniform parallel tilt (FIG. 6, p. 1247) by heating to the isotropic phase and then cooling very slowly with a temperature gradient between the two surfaces, such an approach would not be practical for device applications.

SUMMARY OF THE INVENTION

In accordance with one aspect of our invention, we describe a chemical method for producing a liquid crystal device having relatively high-tilt alignment coatings; i.e., coatings which align LCs at relatively high-tilt angles. The method includes applying to the surface to be coated a composite of two or more surface coupling agents, one of which, if applied alone, would cause the LC director to make an angle $\alpha_1$ with the surface and another of which, if applied alone, would yield $\alpha_2$, but together in combination they produce an acute angle $\alpha_3$ different from $\alpha_1$ and $\alpha_2$. The surface of the coating in contact with the molecules is chemically homogeneous, not microscopically inhomogeneous as in Ong et al., supra.

The term homogeneous used here to describe the spatial uniformity of the surface of the coating should not be confused with the word homogeneous used earlier to describe LC molecules whose directors are oriented parallel to the surface on which the coating is formed.

The combination may be formed by depositing a layer of one alignment material, and reacting it with another, or by forming a combination of such materials, which may or may not react with one another, and then forming a layer from the combination on the surface. By varying the relative concentrations of the agents in the combination, it is possible to balance the surface forces to give any desired tilt angle such as $\alpha_3=5°$ to $85°$. Mechanically deforming the coating along a predetermined direction produces the desired oriented high-tilt boundary condition. Unlike the high-vacuum evaporation approach, there is no intrinsic limitation on the size of the substrate and all angles between homogeneous and homeotropic can be achieved with essentially equal ease.

BRIEF DESCRIPTION OF THE DRAWING

Our invention, together with its various features and advantages, can be readily understood from the following more detailed description taken in conjunction with the accompanying drawing, in which.

DETAILED DESCRIPTION

Figure 1:
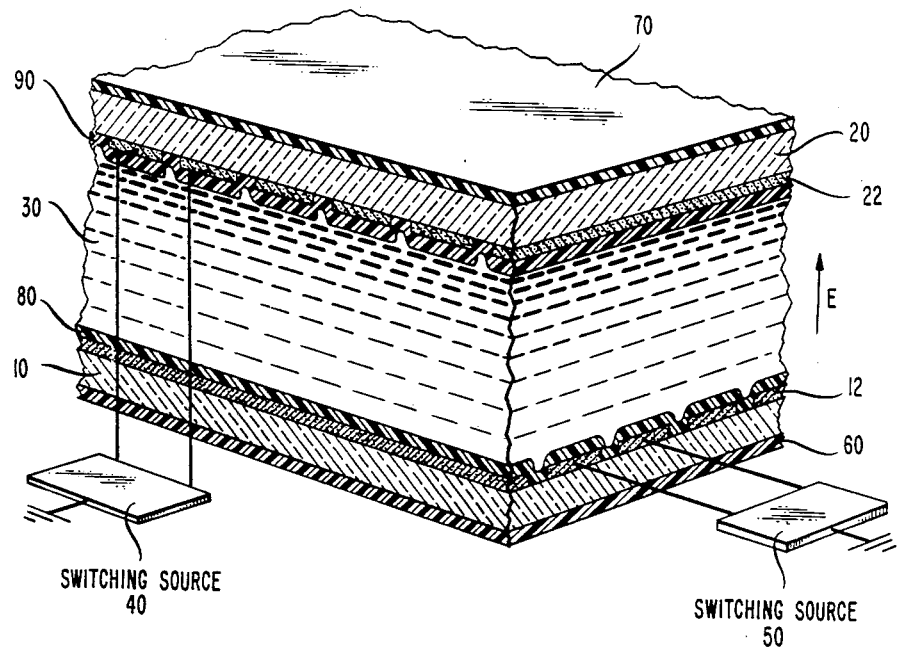
FIG. 1 is a schematic, isometric view of a LCD in accordance with one embodiment of our invention.

With reference now to FIG. 1, there is shown a schematic, isometric view of a portion of a liquid crystal (LC) device, illustratively a cell for use in a liquid crystal display (LCD). The cell includes confinement means such as a pair of essentially parallel plates 10 and 20 which bound a LC material 30 therebetween. The LC material may include a single LC constituent or a plurality of such constituents. Among the suitable LC materials are those which are aligned when undergoing a transition (e.g., when cooled) from an isotropic phase to a nematic or cholesteric phase, even though operation of the device may occur with the LC in a different phase (e.g., smectic). However, operation may also occur, of course, in a nematic or cholesteric phase.

The plates 10 and 20, which are virtually transparent to light, have interior major surfaces on which are deposited electrodes 12 and 22. Where light is to be transmitted through an electrode, it should also be made of virtually transparent material. In an arrangement for matrix addressing or multiplexing the electrodes are patterned to form arrays of closely spaced stripes, with the two arrays being oriented transverse (e.g., perpendicular) to one another. Thus, the LC volume in the region of overlap of each pair of stripes defines a picture element (pel).

The individual pels are selectively addressed by means of suitable electronic circuitry illustratively depicted as a switching source 40 connected to the array of electrodes 22 and a switching source 50 connected to the array of electrodes 12. For simplicity, only two connections to each array are shown. The sources 40 and 50 apply suitable voltages across selected electrodes, thereby applying an electric field E across a preselected pel. The field across the liquid crystal is essentially perpendicular to the cell surfaces.

When used in the common reflection mode, the cell is also provided with a reflector (not shown) which reflects light transmitted through the cell for retransmission out of the viewing surface.

Figure 2:
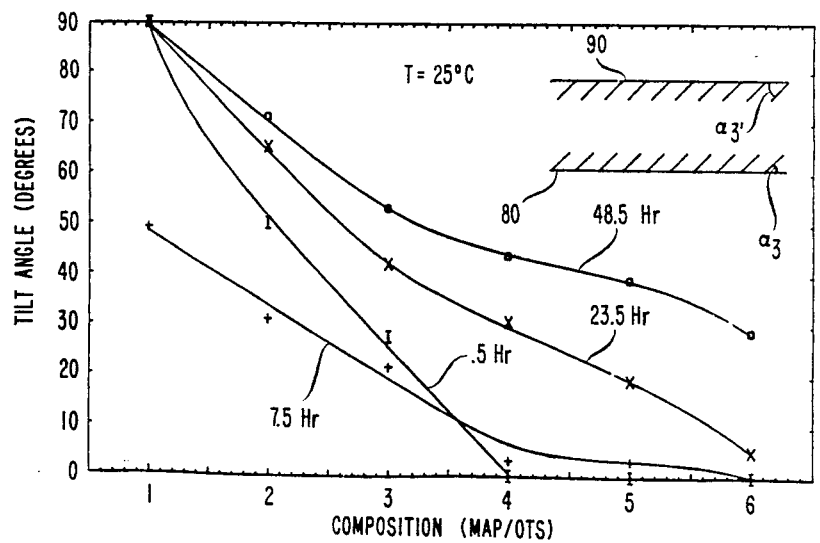
FIG. 2 is a graph of tilt angle versus composition by weight of a mixture of N-methylaminopropyltrimethoxysilane (MAP) and octadecyltrimethoxysilane (OTS). The graph also shows the effect of the age of the solution.

In order to align the molecules of the LC material 30, the cell is further provided with a pair of alignment coatings 80 and 90 on the interior surfaces of the cell. An optical adhesion-promoting layer (not shown) may be applied to the surfaces prior to depositing the coatings. These coatings, which are typically very thin (e.g., on the order of 50-100 Å), cover the plates, or the electrodes, or both. Typically, however, the coatings 80 and 90, as shown, cover the electrodes 12 and 22 as well as the interstitial spaces therebetween. In accordance with one aspect of our invention, coating 80 aligns adjacent molecules of the LC at a predetermined angle $\alpha_3$ (FIG. 2, inset) which is determined by its composition, and coating 90 aligns adjacent molecules at a predetermined angle $\alpha_{3'}$ (FIG. 2, inset) which is determined by its composition. The two angles $\alpha_3$ and $\alpha_{3'}$ may or may not be equal to one another, but typically coatings 80 and 90 produce high-tilt; that is, angles $\alpha_3$ and $\alpha_{3'}$ in the range of, say, 5° to 85°. Each alignment layer is mechanically deformed (e.g., by rubbing its surface with a cloth) along a predetermined direction. However, the predetermined direction for one coating may be different from that for the other coating. The projections of the long axis of the LC molecules adjacent the coatings are aligned along the predetermined directions.

In addition, the LCD includes means for providing optical contrast, illustratively polarizers 60 and 70 formed on the glass plates 10 and 20. The polarizers are oriented with respect to the predetermined (rubbing) directions in a manner well known in the art. Alternatively, contrast can be provided by including a dichroic dye in the LC. In some cases, the dye and a polarizer can be used together.

In one embodiment of our invention, alignment coating 80 is a composite of two or more surface coupling agents (alignment materials) one of which, is applied alone, would cause the LC director to make an angle $\alpha_1$ with the surface and another of which, if applied alone, would yield $\alpha_2$, but together in combination they produce $\alpha_3$ different from $\alpha_1$ and $\alpha_2$. The surface of the composite coating in contact with the molecules is chemically homogeneous, not microscopically inhomogeneous as in Ong et al., supra.

The composite coating may be formed by depositing a first layer of one alignment material, and then forming thereon a second layer of another alignment material. The two layers react with one another so that a surface layer is formed therebetween. The surface layer provides essentially complete coverage of the first layer, and the unreacted portion of the second layer is removed. After mechanically deforming the coating along a predetermined direction, the now exposed surface layer produces oriented high-tilt alignment at $\alpha_3$.

In another embodiment of our invention, alignment coating 80 may be formed by combining different alignment materials and then forming a layer from the combination. The combination may be a mixture of agents which react with one another or which do not so react. In either case, the concentrations of the agents and possibly other factors (e.g., age, temperature) in the combination determine the particular tilt angle $\alpha_3$ that will be produced by the alignment layer formed from that mixture. Thus, by varying the concentrations a range of tilt angles $\alpha_3$ can be attained with different alignment layers. Similar comments apply to alignment coating 90, a combination of surface coupling agents yielding $\alpha_{3'}$ from constituents which, if taken alone, would produce $\alpha_{1'}$ and $\alpha_{2'}$, wheere $\alpha_{3'}$ may be equal to $\alpha_3$, $\alpha_{1'}$ may be equal to $\alpha_1$, and $\alpha_{2'}$ may be equal to $\alpha_2$. In the case where they are equal, of course, the same combination may be used to produce both coating 80 and coating 90.

Illustratively, one constituent (e.g., MAP) of the mixture, if used alone, would produce homogeneous alignment (i.e., $\alpha_1$ or $\alpha_{1'} \sim 0°$) and another constituent (e.g., OTS), if used alone, would produce homeotropic alignment (i.e., $\alpha_2$ or $\alpha_{2'} \sim 90°$). But, when the two are mixed, they produced alignment at a tilt angle of $\alpha_3$ or $\alpha_{3'}$ which can range from 0° to 90° depending on their relative concentrations in the mixture. Thus, high-tilt angles of, say, 5° to 85° are readily attainable. The OTS and MAP materials described above are monomers, but combinations of monomers and polymers or of two or more polymers may also be suitable. For example, a chemically modified polymer comprising a polyimide (which alone produces homogeneous alignment) with attached homeotropic-inducing side chains can also be used. Many organic materials (including organo-metallic materials) find application in our invention.

EXAMPLE

The following example describes LC devices in which the alignment coatings are formed by mixtures of MAP and OTS in various concentrations. The specific parameters and conditions given are illustrative only and are not intended to limit the scope of the invention unless otherwise stated.

An alignment coating of MAP produces homogeneous orientation of LC molecules, whereas a coating of OTS gives homeotropic orientation. Solutions of these materials (3% by weight) were prepared in isopropyl alcohol (IPA) containing 0.5% water and 0.04% acetic acid. These solutions were then combined in various ratios. The solutions were spun onto glass plates which had been previously coated with indium tin oxide, patterned photolithographically to form electrode pads and then cleaned. After being baked for 20 minutes at 120° C., rinsed with IPA, and dried in condensing freon vapors, the plates were buffed with a machine composed of a rotating cylindrical wheel coated with a polyester material and a moving platen which carried the plate beneath the wheel. Test cells were made using antiparallel rubbing directions on the two pieces of glass to produce a parallel-tilt angle configuration (see FIG. 2, inset). The test cells were filled with a nematic liquid crystal (Merck ZLI-1840 purchased from EM Chemicals, Hawthorne, N.Y.), which has a clearing point at 90° C. Filling was done by capillarity in the isotropic phase. The direction of flow during filling was chosen to be perpendicular to the rubbing direction so that a well-aligned sample with the projection of the director in the rubbing direction verified the lack of flow-induced alignment.

Tilt angles were measured using well known magnetocapacitative techniques and well known optical (orthoscopic and conoscopic) techniques.

The tilt angle obtained was found to be strongly dependent on the age of the solution used. As can be seen from FIG. 2, for a given weight ratio of MAP/OTS the tilt angle changes with solution age.

The qualitative effect of rubbing pressure on tilt angle was also investigated. At intermediate tilt angles, pressure had little effect on the magnitude of the angle.

Temperature also affects the tilt angle, and the tilt was observed to decrease with increasing temperature, as is the case for SiO surfaces. The change of angle with temperature was reversible up to about 65 degrees C., but above 70 degrees C. the tilt angle was found to increase with time until the sample became homeotropic.

It is to be understood that the above-described arrangements are merely illustrative of the many possible specific embodiments which can be devised to represent application of the principles of the invention. Numerous and varied other arrangements can be devised in accordance with these principles by those skilled in the art without departing from the spirit and scope of the invention.

What is claimed is:

1. A liquid crystal device comprising
a cell containing a liquid crystal material and having first and second spaced, essentially parallel plates bounding said liquid crystal material,
thin film electrodes formed on an interior major surface of each of said plates, and
alignment coatings formed on both of said plates, characterized in that
at least one of said alignment coatings comprises a composite of alignment materials which cause said molecules to orient themselves at an acute first angle $\alpha_3$ to said plate, the surface of said coating, which is in contact with said molecules, being chemically homogeneous.

2. The device of claim 1 wherein both of said alignment coatings comprises a composite of alignment materials which causes said molecules to orient themselves at an acute angle $\alpha_3$ to one of said plates and at an acute angle $\alpha_{3'}$ to the other of said plates, where $\alpha_3$ may be equal to $\alpha_{3'}$, the surfaces of both of said coatings in contact with said molecules being chemically homogeneous.

3. The device of claim 2 wherein one of said alignment coatings is formed by a combination of one material which, if applied alone, would cause the molecules to orient themselves at an acute angle $\alpha_1$ to one of said plates and another material which, if applied alone, would cause the molecules to orient themselves at an acute angle $\alpha_2$ to said one plate, but when combined together cause said molecules to orient themselves at said acute angle $\alpha_3$, which is different from $\alpha_1$ and $\alpha_2$.

4. The device of claim 3 wherein the other alignment coating is formed by a combination of one material which, if applied alone, would cause the molecules to orient themselves at an acute angle $\alpha_{1'}$ to said other plate and another material which, if applied alone, would cause the molecules to orient themselves at an acute angle $\alpha_{2'}$ to said other plate, but when combined together cause said molecules to orient themselves at said acute angle $\alpha_{3'}$ which is different from $\alpha_{1'}$ and $\alpha_{2'}$.

5. The device of claim 3 or 4 wherein said one material produces homogeneous alignment and said another material produces homeotropic alignment.

6. The device of claim 5 wherein said alignment materials comprise organic compounds.

7. The device of claim 6 wherein said one material comprises MAP and said another material comprises OTS.

8. The device of claim 7 wherein said liquid crystal material is aligned when undergoing a transition from an isotropic phase to a nematic or cholesteric phase.

9. The device of claim 6 wherein said angles $\alpha_3$ and $\alpha_{3'}$ are each within the range of about 5° to 85°.

10. A liquid crystal display comprising
a liquid crystal device according to claim 1, 2, 3 or 4, wherein said electrodes comprise a first array of electrodes on an interior major surface of one of said plates and a second array of electrodes on an interior major surface of the other of said plates, and further including
means for providing optical contrast of electromagnetic radiation transmitted through said liquid crystal material, and
means for applying voltage to selected ones of said electrodes in each of said arrays.

11. The display of claim 10 wherein said one material produces homogeneous alignment and said another material produces homeotropic alignment.

12. The display of claim 11 wherein said alignment materials comprise organic compounds.

13. The display of claim 12 wherein said one material comprises MAP and said another material comprises OTS.

14. The display of claim 12 wherein said angles $\alpha_3$ and $\alpha_{3'}$ are each within the range of about 5° to 85°.

15. A method of fabricating a liquid crystal device comprising the steps of:
   (a) providing a pair of transparent plates from which a liquid crystal cell is to be formed,
   (b) depositing thin film electrodes on said plates,
   (c) forming coatings on each of said plates,
   (d) mechanically deforming said coatings so as to align the molecules of the liquid crystal along a predetermined direction on each of said plates, and
   (e) filling said cell with a liquid material which includes a liquid crystal, characterized in that
   with respect to at least one of said plates, step (c) includes combining at least two alignment materials, one of which, if applied alone to said one plate, would cause molecules of the liquid crystal to orient themselves at an angle $\alpha_1$ thereto, and another of which, if applied alone to said one plate, would cause molecules of the liquid crystal to orient themselves at an angle $\alpha_2$ thereto, and applying the combination of said materials to said plate so as to form a first coating which causes said molecules to orient themselves at an angle $\alpha_3$ thereto, where $\alpha_3$ is different from $\alpha_1$ and $\alpha_2$ the surface of said first coating, which is in contact with said molecules, being chemically homogeneous.

16. The method of claim 15 wherein
   with respect to said other plate, step (c) further includes combining at least two alignment materials, one of which, if applied alone to said other plate, would cause molecules of the liquid crystal to orient themselves at an angle $\alpha_{1'}$ thereto, and another of which, if applied alone to said other plate, would cause molecules of said liquid crystal to orient themselves at an angle $\alpha_{2'}$ thereto, and applying the combination of said materials to said other plate so as to form a second coating which causes said molecules to orient themselves at an angle $\alpha_{3'}$ thereto, where $\alpha_{3'}$ is different from $\alpha_{1'}$ and $\alpha_{2'}$ and may be different from $\alpha_3$ the surfaces of both of said coatings, which are in contact with said molecules, being chemically homogeneous.

17. The method of claims 15 or 16 wherein said one material would produce homogeneous alignment of said molecules and said another material would produce homeotropic alignment.

18. The method of claim 17 wherein said alignment materials comprise organic compounds.

19. The method of claim 18 wherein said one material comprises MAP and said another material comprises OTS.

20. The method of claim 18 wherein said coatings produce $\alpha_3$ or $\alpha_{3'}$ in the range of about 5° to 85°.

21. The method of claim 18 wherein said liquid crystal material is aligned when undergoing a transition from an isotropic phase to a nematic or cholesteric phase.

22. A method of fabricating a liquid crystal device comprising the steps of:
   (a) providing a pair of transparent plates from which a liquid crystal cell is to be formed,
   (b) depositing thin film electrodes on said plates,
   (c) forming coatings on each of said plates,
   (d) mechanically deforming said coatings so as to align the molecules of the liquid crystal along a predetermined direction on each of said plates, and
   (e) filling said cell with a liquid material which includes a liquid crystal, characterized in that
   with respect to at least one of said plates, step (c) includes forming thereon a first layer of a first alignment material which, if applied alone to said one plate, would cause molecules of the liquid crystal to orient themselves at an angle $\alpha_1$ thereto, and reacting said first layer with a second alignment material which, if applied alone to said one plate, would cause molecules of the liquid crystal to orient themselves at an angle $\alpha_2$ thereto, the reaction forming a surface layer which provides essentially complete coverage of said first layer and which is effective to cause said molecules to orient themselves at an angle $\alpha_3$ thereto, where $\alpha_3$ is different from $\alpha_1$ and $\alpha_2$.

23. The method of claim 22 wherein
   with respect to said other plate, step (c) further includes forming thereon a third layer of a third alignment material which, if applied alone to said other plate, would cause molecules of the liquid crystal to orient themselves at an angle $\alpha_{1'}$ thereto, and reacting said third layer with a fourth alignment material which, if applied alone to said other plate, would cause molecules of said liquid crystal to orient themselves at an angle $\alpha_{2'}$ thereto, the reaction forming a surface layer which provides essentially complete coverage of said third layer and which is effective to cause said molecules to orient themselves at an angle $\alpha_{3'}$ thereto, where $\alpha_{3'}$ is different from $\alpha_{1'}$ and $\alpha_{2'}$ and may be different from $\alpha_3$.

24. The method of claims 22 or 23 wherein, with respect to each of said plates, said first and third alignment materials would produce homogeneous alignment of said molecules and second and fourth alignment materials would produce homeotropic alignment.

25. The method of claim 24 wherein said first and third materials comprise MAP and said second and fourth materials comprise OTS.

26. The method of claim 24 wherein said coating produces $\alpha_3$ or $\alpha_{3'}$ in the range of about 5° to 85°.

27. The method of claim 24 wherein said liquid crystal material is aligned when undergoing a transition from an isotropic phase to a nematic or cholesteric phase.

28. The method of claim 22 wherein the second alignment material forms a second layer on said first layer, with said surface layer being formed by the reaction therebetween, and further including the additional step of removing the unreacted portion of said second layer.

29. The method of claim 23 wherein the fourth alignment material forms a fourth layer on said third layer, with said surface layer being formed by the reaction therebetween, and further including the additional step of removing the unreacted portion of said fourth layer

* * * * *